United States Patent [19]

Bangs

[11] Patent Number: 5,778,403
[45] Date of Patent: Jul. 7, 1998

[54] METHOD FOR DISPLAYING TEXT ON A RENDERING DEVICE TO ACCURATELY REPRESENT THE TEXT AS IF DISPLAYED ON A TARGET DEVICE

[75] Inventor: David L. Bangs, Kirkland, Wash.

[73] Assignee: Microsoft Corporation, Redmond, Wash.

[21] Appl. No.: 299,939

[22] Filed: Sep. 1, 1994

[51] Int. Cl.$^6$ ........................................................ G06F 3/00
[52] U.S. Cl. ........................ 707/527; 707/518; 707/519
[58] Field of Search ............................... 395/148, 141, 395/128, 192, 151, 152, 780, 781, 789, 111, 167, 172, 948; 400/1, 2, 3, 9; 707/518, 519, 526, 527; 345/467, 472, 948

[56] References Cited

U.S. PATENT DOCUMENTS 5,500,922  3/1996  Shimura et al. ........................ 395/110

OTHER PUBLICATIONS

Simpson, Mastering WordPerfect®5.1 for Windows™, Sybex Inc., 1993, pp. 71–74 and 1126.

Andre, Jacques and Rolf Ingold, "High Quality Book Production using a Text Editor: A Case Study", pp. 13–20 in Miller, John J. An Introduction to Text Processing Systems: Lecture Notes of a Workshop Held in Association with the Protext I Conference: Oct. 22–23, 1984, Dublin, Ireland, Boole Press, Dublin, 1984.

Gutknecht, J., "Concepts of the Text Editor Lara," *Communications of the ACM*, vol. 28, No. 9, p. 942–960, 1985.

Edited by J. J. H. Miller, *In Introduction to Text Processing Systems*, Lecture Notes of Workshop held in association with PROTEXT I, the First International Conference on Tex Processing Systems, 22–23 Oct. 1984, Dublin Ireland, pp. vii–248, Boole Press Limited First Edition 1984.

Edited by Christoph Hüser, Wiebke Möhr, and Vincent Quint, *Proceedings of the Fifth International Conference on Electronic Publishing, Document Manipulation and Typography*, EP'94, 13–15 Apr. 1994, Darmstadt, Germany, John Wiley & Sons Ltd., 1994.

Jürg Gutknecht and Werner Winiger, *Andra: The Document Preparation System of the Personal Workstation Lilith*, Software—Practice and Experience, vol. 14, pp. 73–100, John Wiley & Sons Ltd., 1984.

*Primary Examiner*—Joseph H. Feild
*Assistant Examiner*—Stephen Hong
*Attorney, Agent, or Firm*—Jones & Askew, LLP

[57] ABSTRACT

A method and system are disclosed for displaying text in a way that is both aesthetically pleasing and faithful to a printed output. Characters of a document displayed by a visual display in a computerized text processing system are positioned accurately with respect to the positions they would occupy in a printout of the document. During ordinary typing of English-language text, as text is typed beginning at the left margin and proceeding rightward, text to the left of the current cursor position does not move about, and its intercharacter spacing (kerning) is stable. The invention can be adapted for text processing in languages other than English. In one aspect of the invention, a processor formats a line of text by formatting the line as for output to a target device, scaling the formatted line by a resolution ratio between the target device and a rendering device, and adjusting the scaled formatted line to improve its appearance as displayed on the rendering device by iteratively applying a series of formatting corrections to pairs of adjacent characters in the line.

7 Claims, 9 Drawing Sheets

ARE THE *SINE QUA NON* OF PATENT VALIDITY.

FOR EXAMPLE IN THE LEADING CASE OF *GRAHAM V. JOHN DEERE CO.* JUSTICE CLARK OBSERVED: "WHILE THE ULTIMATE QUESTION OF PATENT VALIDITY IS ONE OF LAW, THE SECTION 103 CONDITION, WHICH IS BUT ONE OF THREE CONDITIONS. EACH OF WHICH MUST BE SATISFIED, LENDS ITSELF TO SEVERAL BASIC FACTUAL INQURIES. UNDER SECTION 103, THE SCOPE AND CONTENT OF THE PRIOR ART AND THE CLAIMS AT ISSUE ARE TO BE ASCERTAINED; AND THE LEVEL OF ORDINARY SKILL IN THE PERTINENT ART RESOLVED. AGAINST THIS BACKGROUND, THE OBVIOUSNESS OR NONOBVIOUSNESS OF THE SUBJECT MATTER IS DETERMINED. SUCH SECONDARY CONSIDERATION AS COMMERCIAL SUCCESS, LONG FELT BUT UNSOLVED NEEDS, FAILURE OF OTHERS, ETC. MIGHT BE UTILIZED TO GIVE LIGHT TO THE CIRCUMSTANCES SURROUNDING THE ORIGIN OF THE SUBJECT MATTER SOUGHT TO BE PATENTED. AS INDICIA OF OBVIOUSNESS OR NONOBVIOUSNESS, THESE INQUIRIES MAY HAVE RELEVANCY." 383 U.S. 1, 86 S. CT.684,15 L. ED. 2D 545.148 U.S.P.Q. 459 (1966) (CITATIONS OMITTED). THEREFORE, IT CAN READILY BE DEDUCED WITH REFERENCE TO THE FOREGOING ANALYSIS THAT IN ALL CASES IN WHICH IT MAY BE PROFITABLE OR PALATABLE TO UNDERGO AN EXTENSIVE NONOBVIOUSNESS ANALYSIS, AN ATTENTION TO THE BASIC PRINCIPLES OF LAW, SO ARTFULLY SET FORTH BY JUSTICE CLARK, IS MANIFESTLY APPROPRIATE.

FIG.2A

| CHARACTER: | V | E | R | Y | |
|---|---|---|---|---|---|
| $j$ | 1 | 2 | 3 | 4 | |
| $xt_j$ | 50 | 65 | 82 | 116 | } RATIO = 96/300 |
| $xs'_j$ | 16 | 20 | 26 | 37 | |
| $dxs'_j$ | 16 | 4 | 6 | 11 | |
| $dxs_j$ | 12 | 5 | 7 | 9 | |
| $error_j$ | -4 | +1 | +1 | -2 | |

FIG. 7A

| | V | E | R | Y | |
|---|---|---|---|---|---|
| $dxs'_j$ | 13 | 7 | 6 | 11 | } $\Delta = 5$ |
| $error_j$ | N/A | -2 | +1 | -2 | $\delta = 3$ |

FIG. 7B

| | V | E | R | Y | |
|---|---|---|---|---|---|
| $dxs'_j$ | 13 | 5 | 8 | 11 | } $\Delta = 3$ |
| $error_j$ | N/A | N/A | -1 | -2 | $\delta = 2$ |

FIG. 7C

| | V | E | R | Y | |
|---|---|---|---|---|---|
| $dxs'_j$ | 13 | 5 | 8 | 11 | } $\Delta = -1$ |
| $error_j$ | N/A | N/A | N/A | -2 | $\delta = 0$ |

FIG. 7D

METHOD FOR DISPLAYING TEXT ON A RENDERING DEVICE TO ACCURATELY REPRESENT THE TEXT AS IF DISPLAYED ON A TARGET DEVICE

TECHNICAL FIELD

This invention relates generally to computerized text processing, and more particularly to computerized text processing systems and methods incorporating graphical display capabilities.

BACKGROUND OF THE INVENTION

Computerized text processing tools include, among others, word processing applications programs for personal computers, such as "MICROSOFT WORD FOR WINDOWS" (Microsoft Corp., Redmond, Wash.), and so-called desktop publishing applications programs.

Modern text processing tools can be graphically based. That is, they take advantage of the bit-mapped or other graphical capabilities of modern computer displays to present the user with more or less realistic displays portraying how a paragraph, page, document, or other text being processed will appear when printed by a printer.

A major goal of many graphical text processing programs is to represent text being constructed on the screen as accurately as possible as compared with a final printout. Text processors that claim this ability are advertised as having a "What You See Is What You Get" (WysiWyg) functionality.

Early attempts at achieving WysiWyg functionality included word processing programs whose graphical display routines provided crude representations of bold, italic, and underline character attributes. Later programs improved on this idea by presenting text on the screen in the same or similar font or fonts as used for printing. Nevertheless, problems remained in achieving the WysiWyg ideal, including problems stemming from differences in resolution between display screens and printing devices.

Typically, a computer's printer can provide resolution that is significantly higher than the resolution provided by its display screen. For example, a standard VGA display screen provides 96 dots-per-inch (dpi) resolution, whereas a laser printer can provide 300 or 600 dpi resolution, and professional-quality printers can provide still higher resolution, for example, 1200 or 2400 dpi. Moreover, there is no necessary arithmetic ratio or proportionality between the screen and printer resolutions.

Resolution differences can cause text to have a different appearance when displayed on a display than when printed by a printer. In particular, the locations of breaks between lines of text (the "wrap" of the text) can be different as between the screen and the printer. The differences between screen and printer renderings can be exaggerated when an entire page of text is being displayed at once with the "zoom" (magnification-demagnification) feature provided by some text processing programs.

Discrepancies between the screen and the printer can confuse and frustrate the user. For example, if a document is depicted on the display screen in a way that does not accurately represent the locations of line breaks, the user may format the document so that it appears to be correct on the screen, only to find out that the document as printed is not what the user intended and requires extensive reformatting.

Various prior techniques have been developed to attempt to address the problems engendered by resolution differences. Unfortunately, these techniques have significant shortcomings. For example, "WORD FOR WINDOWS 2.0", a version of "MICROSOFT WORD", provides a "Page Layout" view that approximates on the screen the appearance of the printed page. The Page Layout view breaks lines of text at the same locations on the screen as on the printer. Thus, a given line of text will contain the same words on the screen as on the printer. However, lines can appear shorter or longer on the screen than they would on the printer, which can cause the text's margins to appear ragged and can cause text to extend beyond the right margin of the displayed page. To illustrate this problem, consider a line of text consisting of a repeated single lower-case "m": "mmmmmmmmmmmmmmmmm. . . ." A letter "m" printed in the Times New Roman font at a font size of 10 points has a width of 33 pixels on a 300 dpi laser printer, which corresponds to a width of about 10.5 pixels on a standard VGA monitor at 96 dpi. However, the on-screen version of the font has an "m" that is 10 pixels wide, rather than 10.5. Thus there is an error of 0.5 pixels per character. The errors accumulate and, as a result, when the line of "m"s is displayed in Page Layout mode, it terminates far short of the apparent right margin on the screen.

Another version of "MICROSOFT WORD", "VERSION 5.1 OF WORD FOR THE APPLE MACINTOSH" computer (Apple Computer, Inc., Cupertino, Calif.), takes advantage of a "MACINTOSH" system feature called "fractional widths." The operating system keeps track of the characteristics of the active printer and calculates a fractional width of each character for display on the screen. In the previous example, the screen width of each "m" would be reported as 10.5 pixels. The display routines provided by the operating system take the fractional widths into account by adding one extra pixel between every other "m," so as to make the string of "m"s match the right margin exactly. Characters spaced with fractional widths are positioned on the screen precisely as they would be on the printer. However, as a result, the spacing (kerning) between the characters on the screen can appear ugly and disproportionate. This is especially likely if the font being used on the screen is not identical to the one being used on the printer. Thus, "WORD FOR MACINTOSH" positions characters rigidly according to their positions on the printer, without regard for what looks good on the screen.

To produce a display that is both accurate and pleasant in appearance, it is important to take both the screen and printer character widths into account. Some prior systems attempt to do this by treating any difference between the screen width and printer width of a character as an error that is to be distributed uniformly throughout the line of text.

In particular, some prior systems distribute the error by adjusting the sizes of spaces between words. This approach is intended to avoid creating sub-optimal spacing between the letters of an individual word. It works only when a line of text contains a sufficient number of whitespace characters to absorb the total error. In some cases the spaces must be made very narrow, even to the point of disappearing completely, in order to make a line fit properly on the screen. Also with this approach, as the user is typing a new line of text, words already typed appear to move around on the screen.

Certain other prior text processing tools attempt to distribute the error between the letters of individual words in such a way as to preserve aesthetically pleasing character spacing on the screen. To determine where to distribute the errors when placing a character, these systems consider the line of text as a whole. In certain processing tools, this causes a wiggle phenomenon. As the user types a line of text, the letters behind the cursor jiggle around in an unstable way that can be quite distracting to the user. In other processing tools, the wiggle phenomenon is avoided by the expedient of a delayed refresh method. While the user types a line of text, the characters in the line hold still. As soon as the user stops typing, the processing tools redraw the line of text, this time with the newly adjusted intercharacter spacing. Thus, these methods avoid the distracting wiggle artifact only at the expense of introducing an equally distracting redraw artifact.

SUMMARY OF THE INVENTION

The present invention is a method and system for displaying text in a way that is at once pleasing to the eye and faithful to the printed output. All characters on the screen are accurately positioned with respect to where they would actually print. During normal typing of English-language text, as text is typed beginning at the left margin and proceeding rightward, the text that has been typed so far (that is, the text to the left of the current cursor position) remains where it is. The invention does not introduce wiggle or redraw artifacts.

In one aspect, the invention provides a method for use in a text processing system having a processor, software executable by the processor, and a memory operatively coupled to the processor for containing a sequence of characters, as for a line of text. The processor obtains a set of formatting criteria associated with a target device such as a printer, and another set of formatting criteria associated with a rendering device such as a visual display. Both sets of formatting criteria include resolutions and fonts for the respective devices. The processor also obtains a ratio between the target resolution and the rendering resolution. The processor determines a positioning of the characters of the sequence for the target device, and scales the character positions for the target device by the resolution ratio to determine initial positions for the characters with respect to the rendering device. The processor also determines desired corrections to be made to the initial positions. The desired corrections are based on the font and resolution of the rendering device, and are representative of a preferred display appearance for the characters from an aesthetic standpoint. The processor adjusts the positions of the characters of the sequence by iteratively applying adjustments based on the desired corrections to successive pairs of adjacent characters of the sequence, with results of each adjustment being propagated from one character pair to the next as the processor proceeds through the sequence. The adjusted formatting of the character sequence is stored in the memory for further use by the processor, for example, for use in controlling the display of the text by a display device.

The invention will be better understood with reference to the drawings and detailed description below.

BRIEF DESCRIPTION OF THE DRAWINGS

FIGS. 2A–2C are a comparative series of views of a sample text as produced by a printer, a visual display of a text processing system of the prior art, and a visual display of a text processing system according to the invention;

FIGS. 7A–7D illustrate the propagation of values in an example advance width computation according to the present invention.

DETAILED DESCRIPTION OF THE INVENTION

Overview

Figure 1:
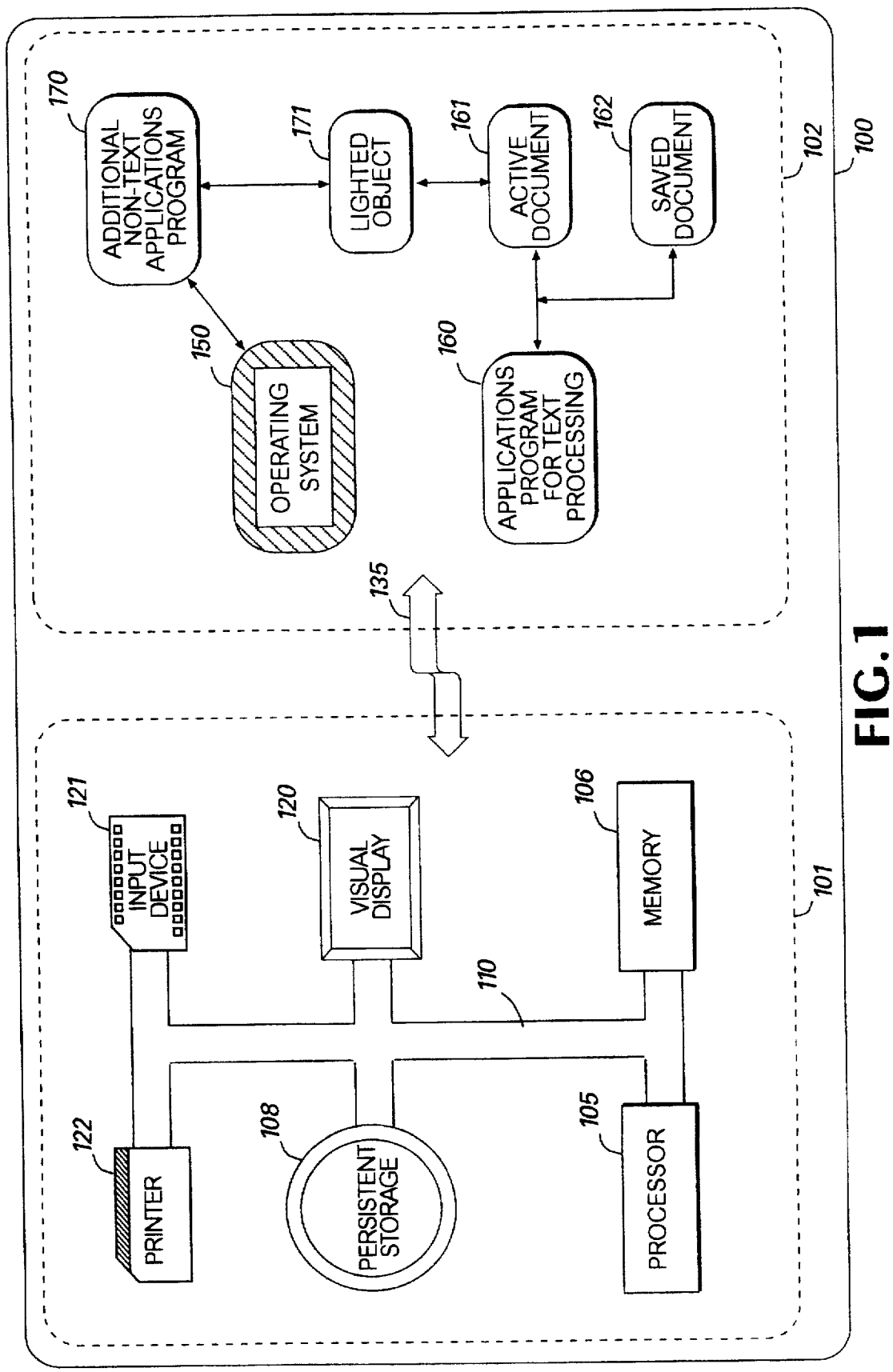
FIG. 1 illustrates the hardware and software to implement an embodiment of the invention.

The present invention provides a way of formatting a line of text for display by a computerized text processing system in a manner that is at once faithful to the appearance of the line of text as printed output and aesthetically pleasing to the viewer of the system's display. The computerized text processing system can be, for example, a personal or other computer executing a word processing program having a graphical user interface (GUI); a computer executing a desktop publishing program; a computer executing a simple GUI-based text processing program that is provided with or as part of the computer's operating system; or any number of other computerized text production and editing systems, whether suitable for processing English-language text or text in other languages.

The concept of an advance width is helpful in describing the invention. The advance width of a character in a line of text is the number of pixels (picture elements) from the leading edge of the character to the leading edge of the next character in the line. Put another way, the advance width is the number of pixels by which a character's inclusion in the line increases the overall printed or displayed length of the line. The advance width can be greater than, equal to, or less than the width of the character itself. If, as is most often the case, the advance width is greater than the character's own proper width, the character is displayed with whitespace pixels after it, so that there is space between it and the next character in the line. For example, if the advance width of a letter A is 25 pixels, and the A itself occupies 20 pixels, then the displayed space immediately after the A and separating the A from the character that follows it is 5 pixels. If the advance width is equal to the character's own width, the character is displayed with no space between it and the next character. If the advance width is less than the character's own width, the character is displayed overlapping the next character.

In a specific embodiment the invention controls the positions of the characters of a displayed line of text by manipulating the advance widths of the characters. Initially, the advance widths of the characters are computed as though the line were to be printed on a printer instead of displayed on a screen or other visual display device. (Neither the printer nor the display need actually be connected to the system during the computation.) The printer is assumed to have a particular resolution (e.g., 300 dpi) and to support one or more character fonts that govern the appearance of printed characters. The positions of the printed characters are scaled by the ratio between the display and printer resolutions to determine initial display positions. Differences between successive initial display positions are calculated to determine the initial advance widths.

Although the initial advance widths accurately reflect the printed output, they are not well suited for controlling the display of the line, because they have been computed solely with reference to print fonts, without taking into account the display fonts supported by the display device. In particular, the initial advance widths tend to produce ill-proportioned intercharacter spacing if used directly to control display of the line.

To compensate for the spacing problem, the initial advance widths are adjusted so as to be more pleasing to the eye, in a process called smoothing. A set of errors (or corrections) is computed based on the differences between the initial advance widths and the advance widths that would be computed if the line were to be displayed on the display without regard to the printer, using fonts and intercharacter spacings adapted to look good on the display. These errors are used as the starting point in computing an adjustment for each character of the line, which is applied to the advance width for each character to produce an adjusted advance width. The adjustments are computed by treating the line as being made up of a sequence of overlapping ordered pairs of adjacent characters. For example, in the line made up of the characters a    b c    d    e       f there are five such pairs, namely (a b), (b c), (c d), (d e), and (e f).

For each given pair, the errors of both characters of the pair are combined to produce a total error. The total error for the pair is then distributed between the characters of the pair. This process is repeated for all the pairs until the advance widths have been adjusted for the entire line. Because the pairs overlap one another, the advance width of every character in the line, other than the first and last characters, is considered and adjusted twice.

The effect of smoothing is to trade excess pixels between adjacent characters. Extra pixels from one character can be reassigned to an adjacent character that has too few pixels. Continuing the previous example, suppose that the first character a as displayed according to the initial advance widths is too far from the second character b, and the second character b is too close to the third character c. On consideration of the first character pair (a b) by the smoothing process, the extra space from the a can be given over to the b. This trade of whitespace pixels decreases the advance width of the a and increases that of the b, effectively shifting the b toward the left margin of the page. Suppose now that the first trade moves the b too far to the left. On consideration of the next character pair (b c) by the smoothing process, the extra space to the right of the b can be given to the c by a second trade of pixels. This trade is accomplished by decreasing the advance width of the b and increasing that of the c. Later in the smoothing process, pixels can be traded between the third character c and the fourth character d, and so on for all pairs of adjacent characters throughout the line.

The smoothing process of the invention is iterative or tail-recursive in nature. Adjustments from one pair can propagate forward into subsequent pairs. Accordingly, the error associated with any given character can potentially be distributed in such a way as to effect any character farther on down the line. The contribution of an earlier character's error to a subsequent adjustment becomes increasingly attenuated as the distance from the earlier character to the subsequent character increases.

The pairwise trading of advance width pixels according to the invention introduces no accumulated inaccuracy into the line. The line's overall displayed length, which is proportional to its printed length before adjustment, remains so after adjustment. Thus, in contrast to certain prior systems and methods, the user is provided with an accurate representation of line length, and is not induced unnecessarily to reformat the line.

The pairwise trading of advance width pixels according to the invention also avoids the wiggle artifact associated with certain prior systems and methods. When a new character is added to the end of a line of text, its advance width cannot affect the advance widths of any other characters except for the character immediately preceding it in the line. Since that preceding character was formerly the last character in the line, its advance width was not visible to the user, and therefore a change in the value of its advance width will likewise not be visible. If a character is inserted, altered, or deleted in the middle of the line, the advance widths of characters preceding it (save for the character immediately preceding it) are not affected, and since the characters following it must shift anyway to make room for the new character, any subtle alterations in their intercharacter spacing are masked by the shift and therefore are not objectionable. In other words, the effects of adding a new character can propagate forward toward the end the line, but cannot propagate backward toward the beginning the line.

A specific embodiment of the invention in the context of a word processing applications program (Microsoft "WORD 6.0 BY MICROSOFT", Inc. of Redmond, Wash.) running in a multiwindowed operating system ("MICROSOFT WINDOWS, VERSION 3.1 or later, also by Microsoft) is described below. Persons of skill in the art will appreciate that the invention can be applied in numerous other contexts as well. In the drawings below, like reference numbers indicate like components. Except as otherwise noted, the description assumes that a single line of left-justified English-language text is to be formatted for display. Multiple lines of text can readily be accommodated by processing each individual line according to the method of the invention on a line-by-line basis.

System Components

FIG. 1 schematically depicts a system 100 suitable for practicing the specific embodiment of the invention described herein. System 100 includes hardware components 101 and software components 102. The hardware components 101 are typical of a computer, such as a personal computer or workstation, having a graphical user interface. They include a processor 105 that is operationally coupled via an interface 110 to a memory 106 and a persistent storage device 108, and that further can be operatively coupled to a visual display 120, an input device 121, and a printer 122. The software components 102, which can be accessed and executed by processor 105 operating in conjunction with the other hardware components, include operating system software 150, an applications program 160 adapted for text processing and in particular for graphical display of text being processed, and an active document 161 that contains text that is currently being processed by the system. The software components 102 can optionally further include a saved document 162, an additional applications program 170 that is adapted for a task other than text processing, and an object 171 that is an encapsulated information representation and that can be linked to active document 161 as well as operated on by additional applications program 170. System 100 can have additional components (not shown), such as additional processors, memory, and storage devices; a modem or network connection; and additional software applications programs or packages executing concurrently, any or all of which can provide text formatting according to the invention.

Processor 105 can be, for example, a microprocessor, such as an 80386, 80486, or Pentium™ microprocessor by Intel Corporation (Santa Clara, Calif.). Memory 106 can include both random-access memory (RAM) and disk-based or virtual memory components. It is used for working storage of information, and in particular is used to store text to be processed and advance widths for the formatting computations of the invention. Persistent storage device 108 can be a hard disk, floppy disk, optical disk, or other mass storage medium. It can in particular be used to store text to be processed or text previously processed, such as saved document 162, and thus can serve as a source of a line of text to be processed according to the invention. Interface 110 can include a bus or other hardware by which processor 105 can communicate with other hardware components.

Visual display 120 can comprise a cathode-ray tube (CRT) or flat-panel display device capable of displaying graphical images (e.g., bit-mapped images). Visual display 120 can also be a virtual-reality device or any other device or system providing a graphical visual image.

Input device 121 can include one or more of any of a wide variety of devices for providing input to a computer system, including, for example, a keyboard, a mouse, a stylus and tablet, or an audio input device. Where input device 121 is suitable for supplying text to the system (e.g., if input device 121 is an alphanumeric keyboard or a speech-to-text transcription subsystem), it can serve as a source of input for active document 161, and thus as a source of a line of text to be processed according to the invention.

Printer 122 can be any hardcopy output device such as a laser printer, ink-jet printer, or impact printer, or any other device that produces an electronic, magnetic, optical, or other equivalent of printed output, such as a microfiche output device or facsimile output device.

Although printer 122 can be operationally coupled to processor 105, it need not be. In particular, the printer can be disconnected or disabled while the invention is operating. This can be the case, for example, when processor 105, memory 106, persistent storage 108, interface 110, visual display 120, and input device 121 are packaged together with software components 102 in a laptop or notebook computer, for use at a location where a printer is not readily available. Similarly, although visual display 120 and input device 121 can be (and in most instances are) operationally coupled to processor 105, they need not be. For example, processor 105 can in some circumstances format a line of text according to the invention for storage by persistent storage device 108, to be displayed or otherwise used at a later time.

The operational coupling of hardware components 101 and software components 102, which is symbolically represented in FIG. 1 by arrow 135, is well understood in the art. In particular, software components 102 each include executable code that can be stored in memory 106 and executed by processor 105, in particular to access persistent storage device 108, to control visual display 120 and printer 122, and to receive and respond to commands from input device 121. Software modules that implement various aspects of the invention can be incorporated into operating system 150, applications program 160, or both.

Applications program 160 assumes that the text of any document, and in particular the text of active document 161, is represented as an ordered series or stream of characters. The stream of characters can be provided to the processor 105 from persistent storage device 108, from input device 121, or from a combination of these text sources (and possibly from additional sources not shown in FIG. 1). The characters of the stream can be divided into one or more constituent character sequences each of which make up a line of text or a portion of a line of text. During the processing of a character sequence, the characters of the sequence are assumed to be buffered, stored, or otherwise contained in memory 106. The characters can include nonprinting characters, formatting codes whose printed representation bears little resemblance to their displayed representation, pointers to external software entities (e.g., a pointer to object 171 if it is linked to active document 161), and other special characters and entities in addition to the alphanumeric characters usually found in text.

Line Length Example

Figure 2B:
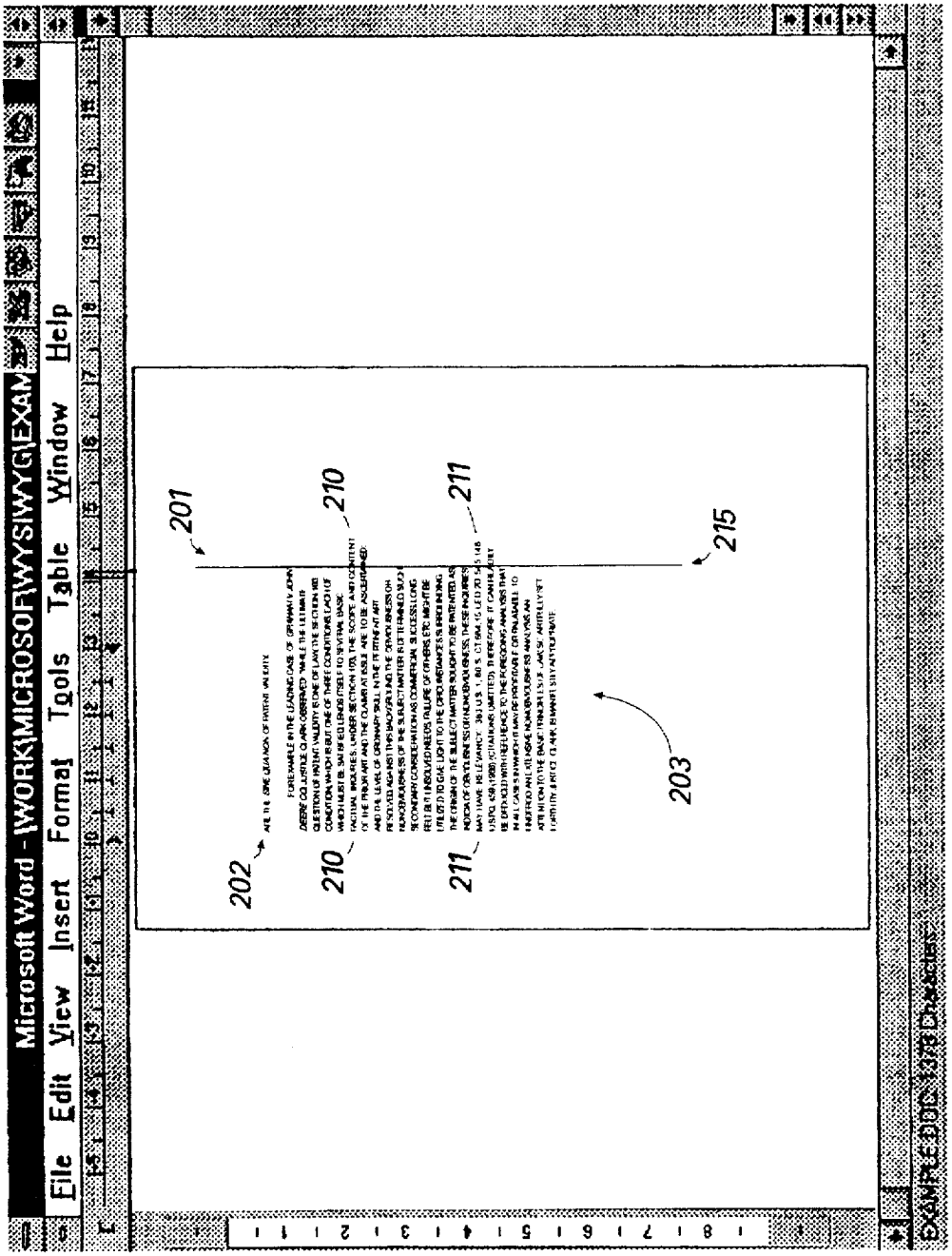
Figure 2C:
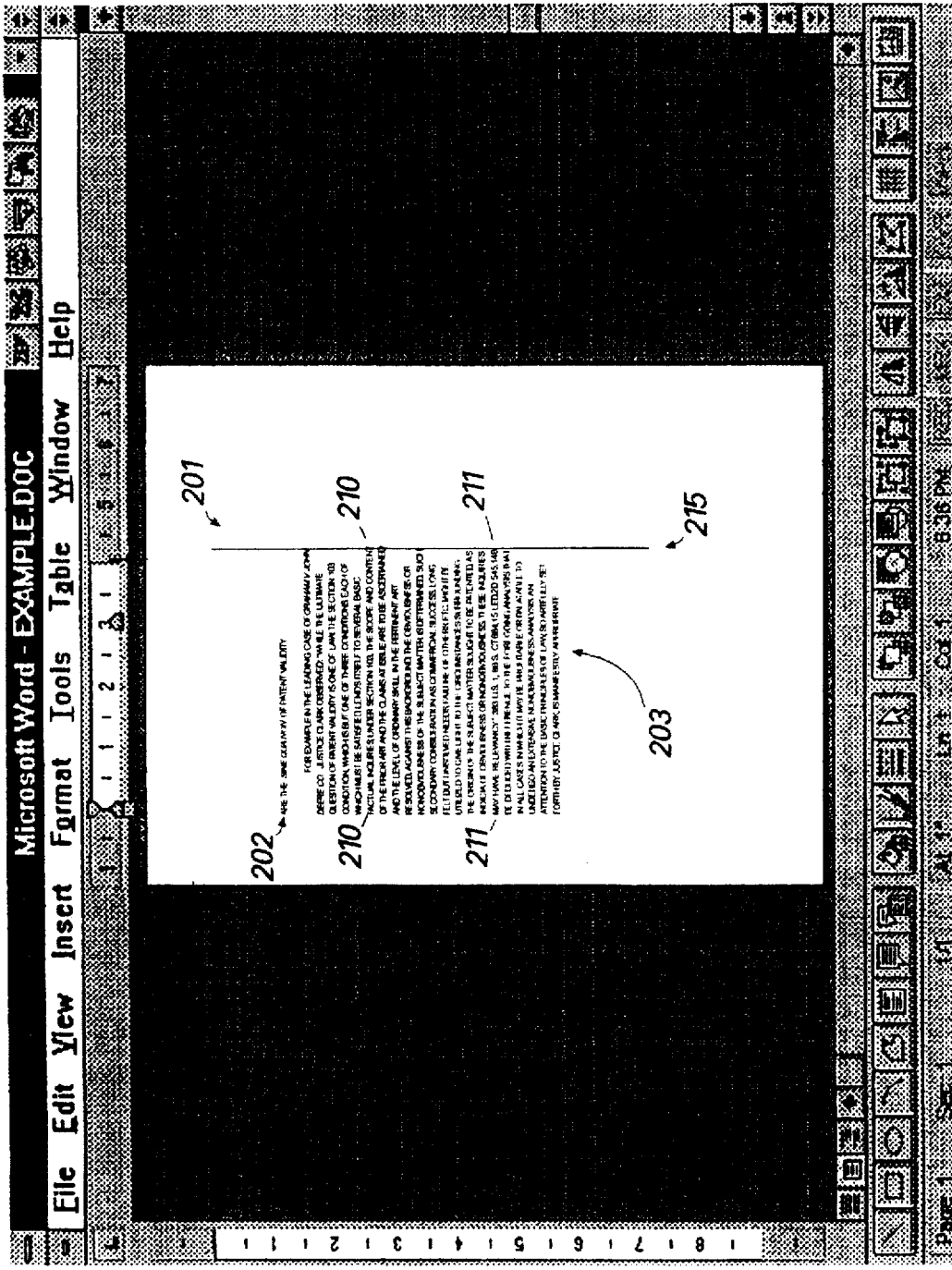

The comparative series of views in FIGS. 2A–2C provides a concrete example of one of the advantages of the present invention. FIG. 2A depicts a printout of a sample text 201. Text 201 is printed in a distinctive sans-serif font in this example. Text 201 includes an isolated line 202 and a paragraph 203 that contains twenty-three (23) lines of text 204. Among the twenty-three lines are lines 210 and 211, which are, respectively, the sixth and seventeenth lines of paragraph 203. Text 201 is formatted in FIG. 2A so that none of the lines 204 extends beyond right margin 215.

FIG. 2B depicts a screen display produced by a prior text processing program while the program is operating on an active document containing the sample text 201 of FIG. 2A. The display is produced by a so-called zoom mode of the program, in which the entire page is reduced to fit in the display. In FIG. 2B, lines 210 and line 211 are disproportionately long. Both extend well beyond right margin 215. Thus the display of FIG. 2B does not provide a faithful representation of the printout of FIG. 2A.

FIG. 2C depicts a screen display produced by a text processing program according to the present invention while the program is operating an active document containing the sample text 201 of FIG. 2A. As in FIG. 2B, the display is produced by a so-called zoom mode of the program, in which the entire page is reduced to fit in the display. In FIG. 2C, lines 210 and 211 appears in correct proportion to right margin 215. Thus the display of FIG. 2C according to the invention provides a faithful representation of the printout of FIG. 2A.

Method Steps

Figure 3:
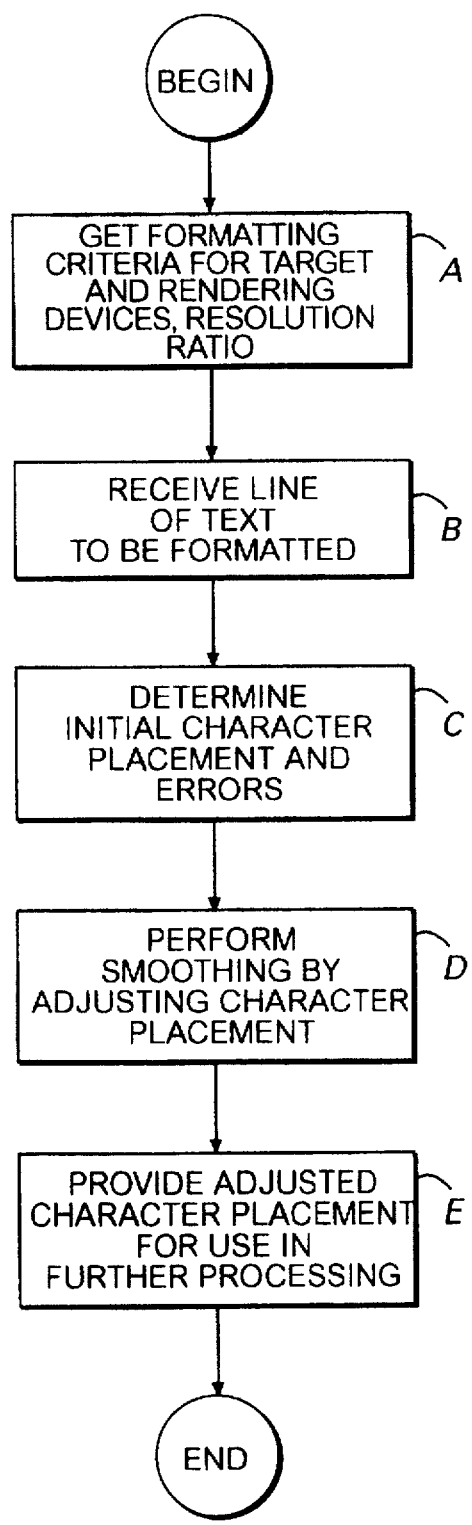
FIG. 3 is a flowchart depicting the high-level steps of the method of the invention.

The processing of a line of text according to the method of the invention in this embodiment proceeds as illustrated in the flowchart of FIG. 3. At the outset, formatting criteria for the printer 122 (the target device) and the display 120 (the rendering device) are obtained (step A). Also, a line of text to be formatted is received (step B). In particular, information is received that contains, or from which can be determined, the character sequence that constitutes the line and the number of characters in the sequence.

Thereafter, an initial placement of the characters of the line is made, and a set of errors is determined (step C). In the initial placement, the characters are positioned according to the line's printed appearance, substantially in proportion to where they would be positioned if the line were printed by the printer. The errors are determined based on desired corrections to the character positions.

Next, smoothing is carried out by using the errors as the basis for a series of adjustments to the character positions (step D). Finally, the adjusted character positions are made available for further processing as the result of the formatting process (step E). For example, the adjusted character positions can be used by processor 105 in conjunction with other information about the characters (e.g., the characters themselves and their total number) to display the line on the display device 120. Alternatively, there can be circumstances in which it is worthwhile to determine the displayed appearance of a line without actually displaying it, for example, as an intermediate calculation by the text processing system during certain more complex line-formatting or page-formatting operations.

The steps of getting the formatting criteria (step A), receiving the line of text (step B), and providing the formatting results for further processing (step E) include using processor 105 to exchange information among various software routines of the software components 102, as is well understood in the art. For example, information can be received in step B in the form of a data structure that represents the line, or a pointer to such a data structure. The data structure or pointer can be stored in memory 106. Similarly, information can be provided by step E in the form of a data structure (e.g., an array) that represents the character positions or the advance widths, or a pointer to such a data structure. Again, the data structure or pointer can be stored in memory 106.

Formatting Criteria and the Resolution Ratio

In step A, formatting criteria are obtained for the target device and the rendering device. The formatting criteria for each device include the resolution of the device and the recommended advance width for each character in the character set of the font to be used. For example, if the target device is a 300 dpi printer printing in 12-point Times Roman font, the formatting criteria for the target device specify that the resolution is 300 dpi, and further specify the preferred advance width in pixels for all the letters, numbers, punctuation marks, and other characters in the 12-point Times Roman print font at 300 dpi resolution. Similarly, if the rendering device is a 96 dpi VGA display displaying in a 10-point Courier font, the formatting criteria for the rendering device specify that the resolution is 96 dpi and further specify the preferred advance width in pixels for all the characters in the 10-point Courier font at 96 dpi resolution. If the text processing application supports a zoom feature, display resolution can vary according to the current degree of magnification or demagnification.

The font and resolution information can be obtained by a call to a routine or routines provided by operating system 150 or applications program 160. The information can be obtained as an initialization step of the line formatting procedure, or can be obtained ahead of time and saved in memory 106 for use during line formatting. In particular, the recommended advance widths for the target font character set and the rendering font character set can be stored as a pair of arrays or lookup tables.

Also in step A, a ratio between the rendering and target resolutions is obtained. This ratio can be determined as an initialization step of the line formatting procedure, or can be computed ahead of time as is convenient and appropriate in the context of the executable software. As an example, if the text processing system 100 supports the simultaneous display of multiple windows of text having different display resolutions or zoom magnifications, it can be appropriate to determine the ratio for each window independently. In contrast with certain prior art systems in which the ratio between display and printer resolutions is guaranteed to be 1, the ratio according to the invention can be an arbitrary number.

The ratio is used in subsequent computations as a scale factor to convert between printer and display metrics (or, more generally, between the metrics of a target device and a rendering device). An example illustrates: Suppose that the printer resolution is 300 dpi, the display resolution is 96 dpi (standard VGA display resolution), and the printed width of a certain character is 33 pixels. The ratio is 96/300 and the scaled width of the character—that is, the number of pixels that the character would occupy on the display if it were mapped without adjustment from its printed representation—is (96/300)×33 pixels, or about 10.5 pixels.

Initial Character Placement and Error Determination

Figure 4:
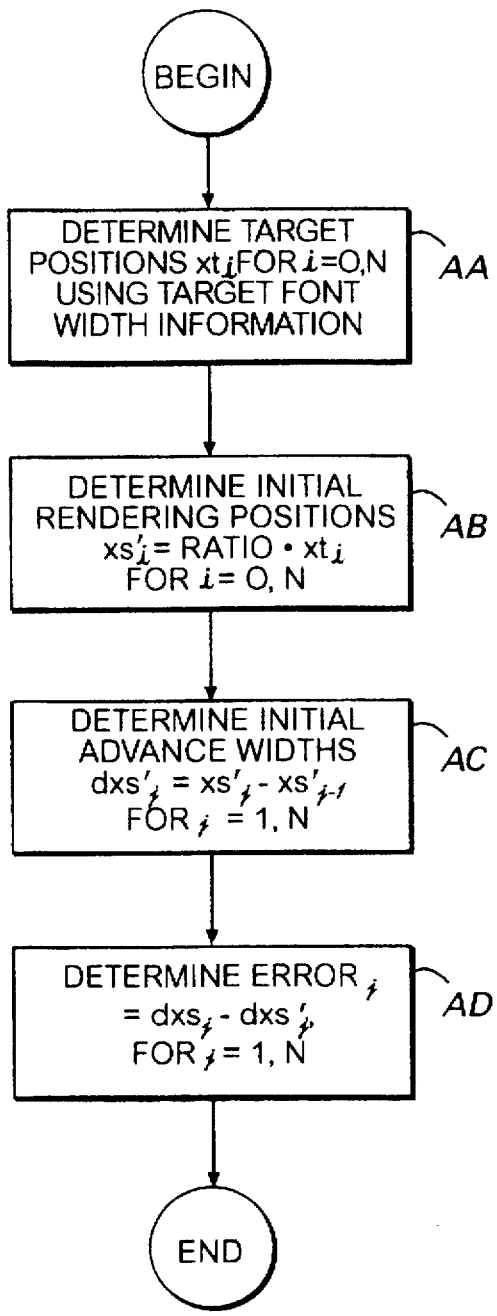
FIG. 4 is a more detailed flowchart elaborating the steps of initial character placement.

The initial placement of characters and determination of errors (step C) is shown in more detail in the flowchart of FIG. 4. FIG. 4 contemplates that the line of text being formatted contains only ordinary characters such as letters, numbers, punctuation marks, and spaces. (The handling of special characters whose displayed representations cannot straightforwardly be mapped from their printed representations is described in connection with FIG. 8 below.) The line is assumed to contain a character sequence of N characters, where N is a nonnegative integer. If N is 0 or 1, the line formatting is trivial. Therefore it is further assumed in FIG. 4 that N is greater than or equal to 2. If N is greater than or equal to 3, this ensures that there are at least 2 overlapping pairs of adjacent characters in the line, so that successive trading and retrading of advance width pixels is possible.

First, a determination is made as to the target positions of the N characters (step AA). This can be accomplished by using the previously obtained formatting criteria for the target device, in particular the font width information. The target position of the ith character is denoted $xt_i$, where the subscript i can take on values from 0 to N ($xt_0$ is defined as 0). It can be calculated by summing successive values of character widths. For example, suppose that the first two characters of the line to be formatted are B e and that the previously obtained recommended or preferred advance widths of the B and e in Times Roman 12-point font at 300 dpi are, respectively, 25 pixels and 14 pixels. Then $xt_0=0$, $xt_1=25$, and $xt_2=25+14=39$.

Next, an initial determination is made as to the rendering positions of the N characters (step AB). This is done by scaling the target positions $xt_i$ by the previously obtained ratio between the rendering and target resolutions. That is, $$xs'_i = R \times xt_i$$

where R is the ratio obtained in step A of FIG. 3 and the subscript i takes on values from 0 to N, inclusive. The scaling of the target positions can be carried out using integer multiplication with truncation of low-order product bits. Depending on the architecture of processor 105, certain register allocations can be used to optimize the scaling operation.

After the initial rendering positions have been determined, initial advance widths are calculated by taking the differences between successive values of the initial rendering positions (step AC). That is, $$dxs'_i = xs'_i - xs'_{i-1}$$

for values of j from 1 to N. Then errors are determined (step AD) as $$error_j = dxs_j - dxs'_j$$

for values of j from 1 to N. Here, $dxs_j$ is the recommended advance width of the jth character of the sequence as rendered on the rendering device. This advance width is readily available from the previously obtained set of recommended advance widths for the rendering font character set.

The errors ($error_j$) represent the difference between the preferred advance widths for the rendering device and the advance widths calculated proportionally to the output of the target device. When a character's error is positive, its advance width is too small, and the character appears to be squeezed too close to its neighbor. When a character's error is negative, its advance width is too large, and the whitespace gap following the character appears too wide. Put another way, the value of $error_j$ represents the correction that should optimally be applied to the jth character's advance width in order to produce the best-looking display on the rendering device.

Smoothing

Figures 5, 6A:
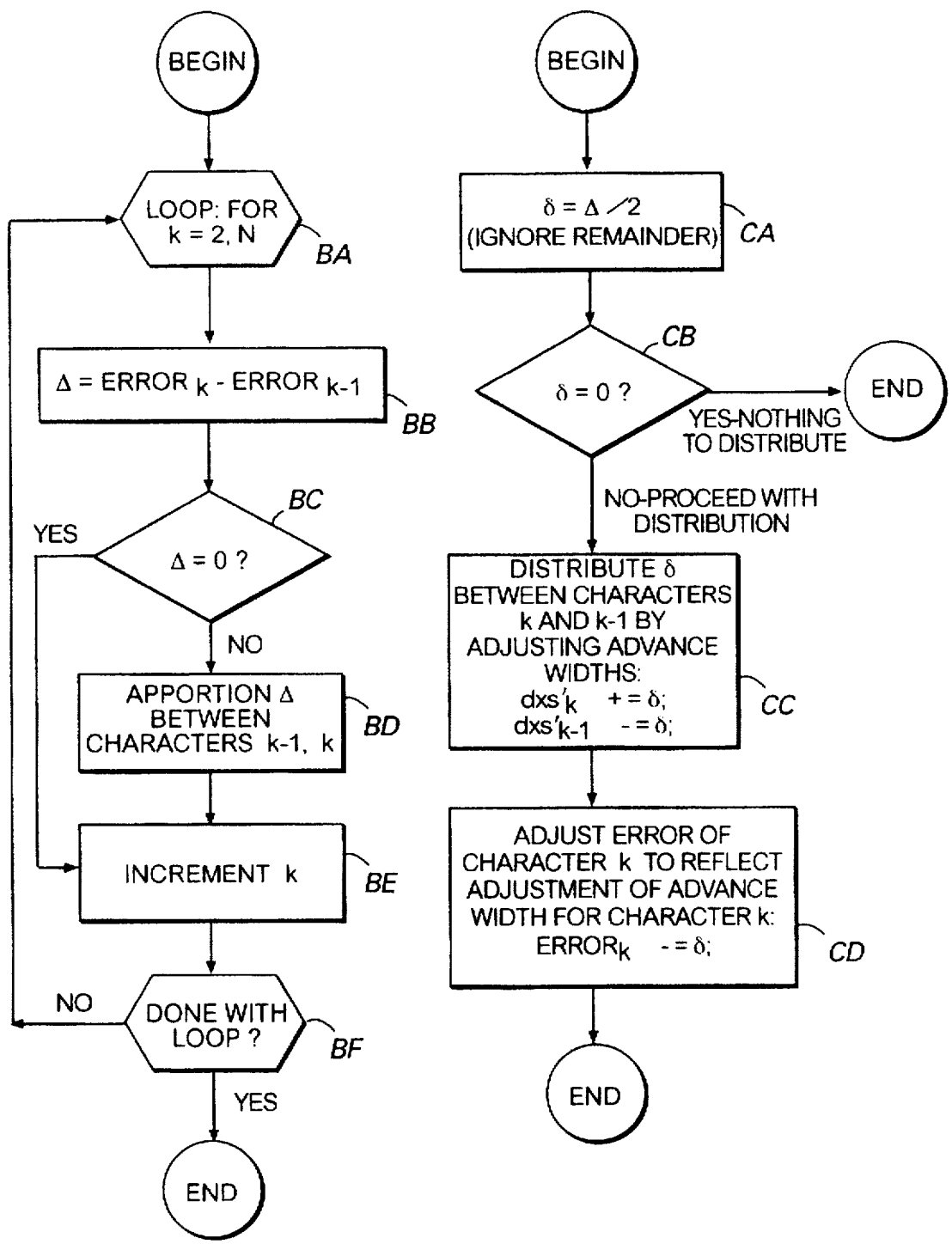
FIG. 5 is a more detailed flowchart elaborating the steps of smoothing by successive pairwise adjustments.
FIGS. 6A–6B are more detailed flowcharts elaborating the steps of appointment during adjustment.

Pairwise trading of advance width pixels occurs during the smoothing process, which is illustrated in the flowchart of FIG. 5. A loop is performed for the index variable k, which takes on successive integer values from 2 through N, inclusive (step BA). That is, the loop causes adjustments to be performed for successive characters beginning with the second character in the line and ending with the last character in the line. This is equivalent to performing an adjustment for successive overlapping pairs of adjacent characters, beginning with the first pair in the line and ending with the last. Persons of skill in the art will recognize that the looping construct adopted here is but one of many iteration or recursion constructs that could be used, and in particular, that the iteration or recursion could be based on an index variable that refers to pairs instead of characters.

A difference between the error of the currently indexed character (the kth character) and the error of the previous character (the k-1th character) is computed (step BB). This difference will be called a delta value. That is, $$\Delta = error_k - error_{k-1}$$

for the current value of k. If the delta value is zero (step BC), there are no advance width pixels to be traded, and processing continues with the next character in the sequence. If the delta value is nonzero, it is apportioned between the k-1th and kth characters, thus causing advance width to be traded between these characters (step BD). The index variable k is incremented (step BE) and processing continues until all characters have been adjusted, that is, until the value of k exceeds N (step BF).

Figure 6B:
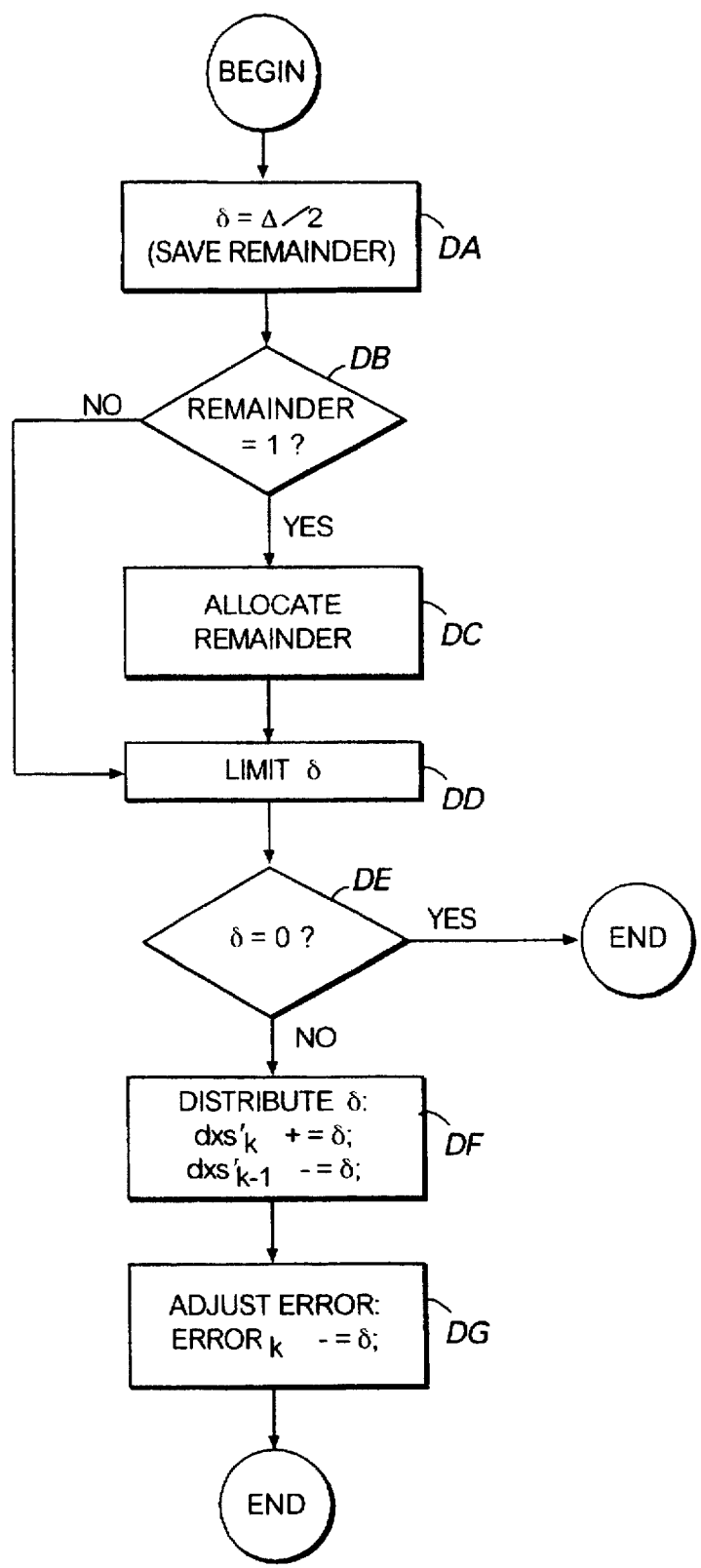

The apportionment step BD is illustrated in more detail in the flowcharts of FIGS. 6A–6B. FIG. 6A shows a simple apportionment procedure in which the delta value $\Delta$ is divided by two, using integer arithmetic, and the integer portion of the division result is kept as the quotient $\delta$ (step CA). The fractional portion of the division result (the remainder), if any, is truncated and thus ignored. If the quotient $\delta$ is nonzero (step CB), it is distributed equally between the characters of the current pair by adding it to the initial advance width of the currently indexed character and subtracting it from the initial advance width of the previous character (step CC). The results of this distribution are saved, preferably in the same array or data structure used to contain the initial advance width, that is, in $dxs'_k$. In the nomenclature of the well-known programming language C, the distribution of the quotient $\delta$ can be written as:

$$dxs'_k += \delta;$$

$$dxs'_{k-1} -= \delta;$$

where += means, "add the value of the variable on the right side of the += to the value of the variable on the left side, and store the result as an updated value for the variable on the left side." Similarly, -= means, "subtract the value of the variable on the right side of the -= from the value of the variable on the left side, and store the result as an updated value for the variable on the left side." The error associated with the current character is also adjusted by the quotient $\delta$ (step CD):

$$error_k -= \delta;$$

This adjustment causes $error_k$ to be equal to the difference between $dxs_k$ and the adjusted value of $dxs'_k$. There is no need to update the previous character's error (as by performing the operation $error_{k-1} += \delta;$), because the previous error will play no further role in the adjustment process.

FIG. 6B shows a more sophisticated apportionment procedure that provides superior visual display results as compared with that of FIG. 6A, although at a cost of some computational complexity. In FIG. 6B, the delta value $\Delta$ is divided by two, using integer arithmetic, and the integer portion of the division result is stored as the quotient $\delta$ (step DA). The remainder, which is either 0 or 1, is preserved from the division.

If the remainder is nonzero (step FB), $\Delta$ is odd, and so the advance width that it represents cannot be evenly distributed between the two characters of the current pair. A determination is made as to how best to allocate the spare pixel (step DC). Because the k-1th character will not be revisited again during the smoothing process, whereas the kth character (if k<N) will be revisited on the next iteration, the spare pixel should be allocated so as to produce the optimal correction to the k-1th character, at the expense of the kth character. It can be shown that if the expression $$(\delta > 0) \; \&\& \; (error_{k-1} < -error_k)$$

$$\|(\delta < 0) \; \&\& \; (error_k < -error_{k-1})$$

is true, where && and || are, respectively, the Boolean logical and and or operators, then the spare pixel should be allocated to the kth character. This can be done by increasing $\delta$ by 1, which increases by 1 the number of pixels added to the kth character's advance width in step DF.

Next, $\delta$ is limited by a minimum or maximum function (step DD). In particular, if $\delta$ is greater than zero, which implies that the k-1th character is to be given extra advance width pixels at the expense of the kth character, $\delta$ is updated to be the minimum of itself and $(dxs'_{k-1} - 1)$. Conversely, if $\delta$ is less than zero, which implies that the k-1th character is to be given extra advance width pixels at the expense of the kth character, $\delta$ is updated to be the maximum of itself and $(1 - dxs'_k)$. The minimax operation ensures that each character has a minimum advance width of 1 pixel after adjustment, so that a character cannot be deprived of all its pixels by the adjustment process.

Thereafter, if δ is still nonzero (step DE), it is distributed between the currently indexed character and its immediate predecessor character (step DF), in the manner previously described for step CC of FIG. 6A. Also, the error associated with the currently indexed character is updated (step DG), in the manner previously described for step CD of FIG. 6A.

An Example of Smoothing

FIGS. 7A–7D illustrate the adjustment process of as applied to a sample line of text that contains the single word "Very." The line includes the four characters V e r y and can be divided into three pairs of adjacent characters, namely (V e), (e r), and (r y). The resolution ratio is 96/300. The apportionment procedure of FIG. 6B is used. FIG. 7A shows the initial values of j, $xt_j$, $xs'_j$, $dxs'_j$, $dxs_j$, and $error_j$ prior to smoothing.

The V and the y are both too wide, while the e and the r are both too narrow. Thus, if the line is displayed without smoothing, it will be rendered with an apparent gap after the V, with the e appearing slightly too close to the r, and with the r appearing slightly too close to the y.

FIG. 7B shows the values of $dxs'_j$ after adjustment of the first pair of characters (V e). The delta value Δ is 1−(−4)=5 and the value of the adjustment δ (after allocation of the remainder pixel) is 3. Thus 3 pixels are transferred from the V and to the e, which substantially closes the gap after the V but introduces a too-wide gap between the e and the r. The error for the e is adjusted so as to equal the difference between $dxs_2$ and the newly adjusted value of $dxs'_2$. The error for the V is no longer needed and is not adjusted.

FIG. 7C shows the values of $dxs'_j$ after adjustment of the second pair of characters (e r). The delta value Δ is 3 and the adjustment δ is 2. Some of the advance width pixels previously transferred from the V to the e are now transferred from the e to the r. This restores the e to its appropriate spacing. The r is now slightly too far from the y.

FIG. 7D shows the values of $dxs'_j$ after adjustment of the third pair of characters (r y). The delta value Δ is −1 and the adjustment δ is 0. Thus the third adjustment does not affect the positions of the r and the y.

Biasing and Special Characters

The invention is readily adaptable to text that contains special characters whose print or target widths are not proportionally related to their display or rendering widths. Such characters include date codes and other field codes, hidden text, embedded graphics, linked objects (such as object 171 if it is linked to active document 161), and many other characters, codes, and entities familiar to those of skill in the art. For example, a date code can appears as a current date (e.g., "July 4, 1995" or "December 1, 2003" or "2/29/60") when printed, but appear as a symbolic expression (e.g., "{DATE CODE}") when displayed. As printed, the date code occupies a width that can vary depending on the month of the year and on the chosen date format. As displayed, the date code occupies a fixed width that bears no relation to the printed width.

An approach to handling special characters in a specific embodiment is to treat the line of text not as a single sequence of characters, but as a collection of several sequences to be formatted independently of one another. The method of the invention is applied as though each special character marked the beginning of a new character sequence. No attempt is made to perform smoothing adjustments to special characters.

Figure 8:
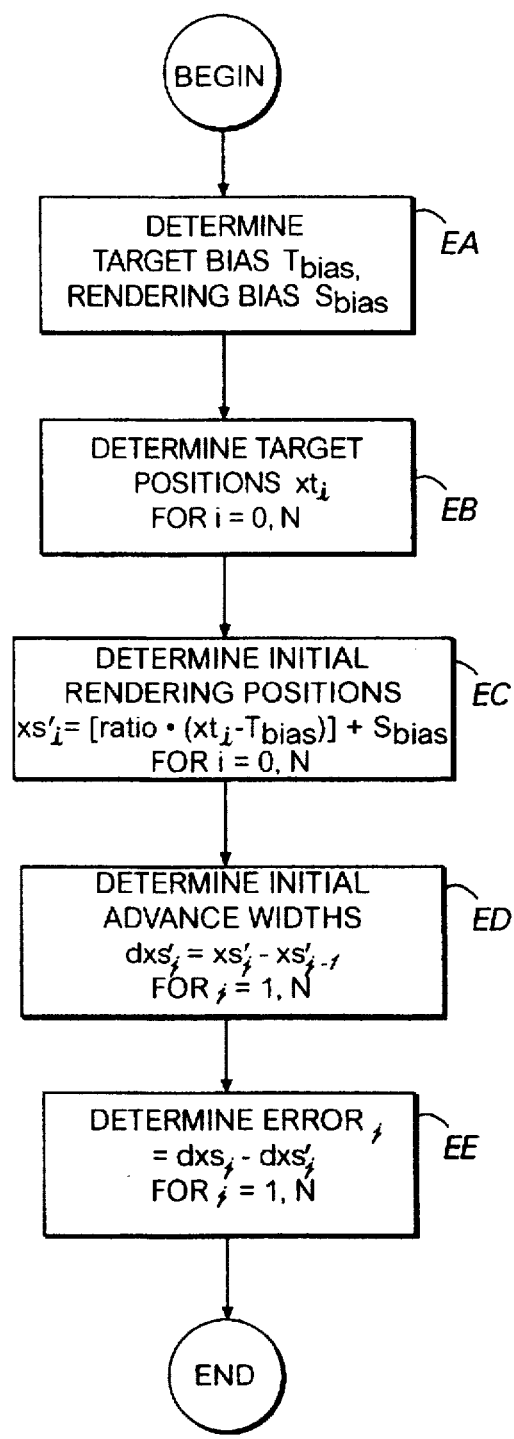
FIG. 8 is a flowchart elaborating the steps of initial character placement in an alternative embodiment that supports biasing.

It suffices, therefore, to describe the processing of a sequence of ordinary characters that is immediately preceded by a special character. FIG. 8 illustrates this case. More particularly, the steps of FIG. 8 are followed instead of the steps of FIG. 4 in order to carry out step C of FIG. 3 for this case. As before, the sequence is assumed to contain N characters, where N is an integer greater than or equal to 2.

At the outset, bias values are calculated based on the target width and rendering width of the special character (step EA). The target bias $T_{bias}$ is the width of the special character's appearance when output on the printer or target device, and the rendering bias $S_{bias}$ is its width when output on the display or rendering device. If the special character appears in the middle of the line, the position of its leading edge can be added to the bias. For example, if the special character appears at pixel 400 of the printed line and spans 50 pixels when printed, $T_{bias}$=450. If the special character appears at pixel 100 of the display and spans 20 pixels when displayed, $S_{bias}$=120.

A determination is made as to the target positions $xt_i$ of the N characters (step EB). This is done in the same manner as for step AA of FIG. 4, except that here, $xt_0=T_{bias}$. Thus, for example, if $T_{bias}$=450 and the first character spans 30 pixels according to the previously obtained printer font, $xt_0$=450 and $xt_1$=480.

Next, the initial rendering positions $xs'_i$ are determined for values of i from 0 to N, taking into account both $T_{bias}$ and $S_{bias}$ (step EC). Specifically, $$xs'_i = S_{bias} + \lfloor R \times (xt_i - T_{bias}) \rfloor$$

The scaling of the biased target positions can be performed using integer multiplication with truncation as previously described.

Thereafter, initial advance widths $dxs'_j$ are calculated (step ED) by taking the differences between successive values of $xs'_j$, for values of j from 1 to N, in the same manner as for step AC of FIG. 4. (If $xs'_i$ and $S_{bias}$ are not otherwise needed by the text processing system, $S_{bias}$ can be ignored or set to zero in step EC, since it cancels out of the subtraction in step ED.) Finally, errors are calculated (step EE) in the same manner as for step AD of FIG. 4.

Variations and Extensions

In the specific embodiment that has been described, it is assumed that during ordinary text entry, a line is redrawn every time a new character is entered. Continuing the previous example, suppose that the line containing the word "Very" is extended by adding the characters g, o, o, d to the end of the line, one character at a time, from a keyboard or other input device 121. After the g is added, the line reads:

Veryg

After the first o is added, the line reads:

Verygo

After the second o is added, the line reads:

Verygoo

Finally, after the d is added, the line reads:

Verygood

As each new character is added, the line is reformatted anew, for a total of four reformattings and a total of 4+5+6+7=22 pairwise adjustments. Yet, by the very nature of the invention, the addition of each new character does not affect the display positions of characters that precede it.

Thus, in certain situations such as simple text entry at the end of an existing line or document, the invention can be efficiently implemented in an embodiment that computes adjustments on a character-by-character basis rather than on a line-by-line basis. If such an embodiment is used in the above example, adding the g to the line causes only the advance widths of the y and the g to be calculated; adding the first o causes only the advance widths of the g and the o to be calculated; and so forth. The advance widths of earlier characters are simply left unchanged. Although the per-character embodiment reduces the number of computations required during entry of new text, it can lead to greater overhead because of the need to keep track of what has or has not changed on a per-character rather than a per-line basis.

In the specific embodiment that has been described, the case of entry of text at the beginning of a right-justified line of text poses a special problem. This case is illustrated by the following example:

```
-justified line of text
r-justified line of text
ri-justified line of text
rig-justified line of text
righ-justified line of text
right-justified line of text
```

As each new character is added to the left end of the right-justified line, the line is reformatted, beginning with the leftmost character and proceeding rightward. This reformatting affects all intercharacter spacings in the line and thus produces an undesirable wiggle artifact. The wiggle artifact is avoided in an embodiment of the invention in which the processor can reverse the direction in which characters of the line are considered and adjusted. For example, when text is entered at the left end of a right-justified line, the processor can adjust characters beginning with the rightmost end of the line and proceeding leftward. During reverse-order smoothing, a character's advance width indicates the amount of space between the trailing edge of the character and the trailing edge of the immediately preceding character.

In another embodiment, WysiWyg smoothing according to the invention can selectively be disabled under program or user control. For example, a text processing program can disable adjustments in situations where the overhead for such adjustments is great and the benefit small, as when a document is viewed in a zoom mode with a high magnification so that characters appear significantly larger on the display than in the corresponding printout.

In yet another embodiment, the sequence to be formatted is not known ahead of time. Instead, the sequence can be constructed and smoothed incrementally, one character pair at a time, as an integral part of a larger computation that determines the length and contents of the printed line. The line can be extended, a character or a word at a time, until further extension would cause the length of the printed line to exceed a designated length determined with reference to a page margin or other criterion. Moreover, in such an embodiment, if the delta value (or the equivalent information) from the most recent adjustment is preserved, the adjustment can be reversed after the fact. This can facilitate the larger computation in some circumstances.

In still other embodiments, the invention can be applied in text processing systems for languages other than English, and in particular, for languages that are read from right to left (e.g., Hebrew, Arabic) or vertically (e.g., Chinese).

The specific embodiments that have been described are provided by way of illustration and not of limitation. Many other embodiments, variations, and extensions of the system and method of the invention will be apparent to those of skill in the art. Accordingly, the scope of the invention is not limited to the foregoing specification, but instead is given by the appended claims and their full range of equivalents.

I claim:

1. A method in a computer system for displaying a line of text on a rendering device, the line of text to be displayed in a manner that visually approximates a display of the line of text on a target device, the line of text comprising a plurality of characters, the target device having a target font with a target advance width for each character, the rendering device having a rendering font with a rendering advance width for each character, the method comprising:

initializing a position of each character of the line of text in proportion to the target advance widths of the target font; and for each character of the line of text after a first character of the line of text, selecting the character;

subtracting the position of a character immediately preceding the selected character from the position of the selected character to calculate a current advance width of the preceding character;

subtracting the current advance width of the preceding character from the rendering advance width of the preceding character to calculate an advance width error of the preceding character;

subtracting the position of the selected character from a character immediately following the selected character to calculate a current advance width of the selected character;

subtracting the current advance width of the selected character from a rendering advance width of the selected character to calculate an advance width error of the selected character;

subtracting the advance width error of the preceding character from the advance width error of the selected character to generate an overall error; and when the overall error is not zero, adjusting the position of the selected character to apportion the overall error equally between the advance width of the preceding character and the advance width of the selected character, and wherein, when the selected character is a new character that is inserted into a line of text already displayed, the newly inserted character is treated as the first character of the line so that only the positions of characters following the newly inserted character are initialized and adjusted; and outputting the line of text to the rendering device based on the adjusted position of the characters.

2. The method of claim 1 wherein the rendering device has a rendering resolution and the target device has a target resolution, wherein the target advance width is calculated for each character based on the target font and the target resolution, and wherein the rendering advance width is determined for each character by proportionally scaling the target advance width by the ratio of the rendering resolution divided by the target resolution.

3. The method of claim 2 wherein the target advance widths are proportionally scaled to determine the rendering advance width by multiplying each target advance width by a ratio, the ratio calculated by dividing the rendering resolution by the target resolution.

4. A method in a computer system for preparing a line of text for display, the line of text comprising a plurality of characters, each character of the line of text having a position within the line of text, each character having a desired advance width, the method comprising:

for each character of the line of text after a first character of the line of text,
selecting the character;
subtracting the position of a character immediately preceding the selected character for the position of the selected character to calculate advance width of the preceding character;
subtracting the advance width of the preceding character from the desired advance width of the preceding character to calculate an advance width error of the preceding character;
subtracting the position of the selected character from a character immediately following the selected character to calculate the advance width of the selected character;
subtracting the advance width of the selected character from the desired advance width of the selected character to calculate an advance width error of the selected character;
subtracting the advance width error of the preceding character from the advance width error of the selected character to generate an error difference; and
when the error difference is not zero, adjusting the position of the selected character to apportion the error difference equally between the advance width of the preceding character and the advance width of the selected character, and wherein, when the selected character is a new character that is inserted into a line of text already displayed, the newly inserted character is treated as the first character of the line so that only the positions of characters following the newly inserted character are adjusted.

5. A method in a computer system for displaying a line of text on a rendering device, the line of text to be displayed in a manner that visually approximates a display of the line of text on a target device, the line of text comprising a plurality of characters, the line of text having a first character, a last character, and remaining characters that occur between the first character and the last character, the target device having a target font and target resolution, each character having a desired target advance width that is determined from which target font and target resolution, the rendering device having a rendering font and a rendering resolution, each character having a desired rendering advance width that is determined from which rendering font and rendering resolution, the method comprising the steps of:

calculating a scaling ratio by dividing the rendering resolution by the target resolution;
assigning target display positions for the first and last character of the line of text that are obtained when each character in the line of text is positioned to have the desired target advance width determined for the character;
assigning rendering display positions for the first character and last character of the line of text, the rendering display positions calculated by multiplying the target display positions assigned to the first and last character of the line of text by the calculated scaling ratio; and
placing the remaining characters of the line of text for display to the rendering device at positions between the rendering display positions assigned to the first and last characters so that a sum of differences between an advance width of each character as positioned within the line of text and the desired rendering advance width of each character is minimized.

6. A computer memory encoded with executable instructions representing a computer program that cause a computer system to display a line of text on a rendering device that visually approximates a display of the line of text on a target device, the line of text comprising a plurality of characters, the line of text having a first character, a last character, and remaining characters that occur between the first character and the last character, the target device having a target font and target resolution, each character having a desired target advance width that is determined from the target font and target resolution, the rendering device having a rendering font and a rendering resolution, each character having a desired rendering advance width that is determined from the rendering font and rendering resolution, the computer program causing a computer system to display the line of text by:

calculating a scaling ratio by dividing the rendering resolution by the target resolution;
assigning target display positions for the first and last character of the line of text that are obtained when each character in the line of text is positioned to have the desired target advance width determined for the character;
assigning rendering display positions for the first character and last character of the line of text, the rendering display positions calculated by multiplying the target display positions assigned to the first and last character of the line of text by the calculated scaling ratio; and
placing the remaining characters of the line of text for display to the rendering device at positions between the rendering display positions assigned to the first and last characters so that a sum of differences between the advance width of each character as positioned within the line of text and the desired rendering advance width of each character is minimized.

7. A computer system for displaying a line of characters on a rendering device that visually approximates a display of the line of characters on a target device, each character when displayed on the rendering device having a desired advance width and when displayed on the target device having a target advance width comprising:

means for determining an initial position of each character based on the target advance widths;
means for adjusting the position of each character such that a difference between the target advance width and the desired advance width of two adjacent characters is minimized while maintaining a line width that is proportional to a sum of the target advance widths of the characters, and wherein, when a new character is inserted into a line of characters already displayed, the newly inserted character is treated as the first character of the line so that only the positions of characters following the newly inserted character are adjusted; and
means for displaying each character on the rendering device at it determined position.

* * * * *